US008827523B1

(12) United States Patent
Sun et al.

(10) Patent No.: US 8,827,523 B1
(45) Date of Patent: Sep. 9, 2014

(54) CANDLE-LIKE LIGHTING DEVICE

(71) Applicant: National Central University, Taoyuan County (TW)

(72) Inventors: Ching-Cherng Sun, Taoyuan County (TW); Yi-Chien Lo, Miaoli County (TW); Hui-En Liu, Taoyuan County (TW); Kuan-Hung Lee, Chiayi (TW)

(73) Assignee: National Central University, Taoyuan County (TW)

( * ) Notice: Subject to any disclaimer, the term of this patent is extended or adjusted under 35 U.S.C. 154(b) by 0 days.

(21) Appl. No.: 13/855,094

(22) Filed: Apr. 2, 2013

(51) Int. Cl.
*F21V 5/00* (2006.01)
*F21V 23/04* (2006.01)
*F21V 8/00* (2006.01)

(52) U.S. Cl.
CPC .......... *F21V 23/0407* (2013.01); *G02B 6/0096* (2013.01)
USPC .......................................... 362/569; 362/161

(58) Field of Classification Search
CPC ................................. F21S 6/001; F21S 10/04
USPC ................................................ 362/569, 161
See application file for complete search history.

(56) References Cited

U.S. PATENT DOCUMENTS

| 6,361,192 | B1* | 3/2002 | Fussell et al. | 362/331 |
| 6,971,779 | B2* | 12/2005 | Tau et al. | 362/555 |
| 2005/0243550 | A1* | 11/2005 | Stekelenburg | 362/240 |
| 2008/0130266 | A1* | 6/2008 | DeWitt et al. | 362/96 |
| 2012/0087144 | A1* | 4/2012 | Tseng | 362/555 |
| 2013/0039060 | A1* | 2/2013 | Bakk | 362/235 |

* cited by examiner

*Primary Examiner* — Evan Dzierzynski
(74) *Attorney, Agent, or Firm* — Rosenberg, Klein & Lee

(57) ABSTRACT

An candle-like lighting device includes a light body having a diffuser, a light guider and a light source; the diffuser having a plurality of diffusing particles mounted therein; the light guider having a reflecting portion defined at one end thereof and having a refracting portion defined at another end thereof, the diffuser sleeving the light guider; and the light source assembled to the light guider. Wherein, partial light beams from the light source are reflected by the reflecting portion toward the refracting portion and are refracted by the refracting portion into the diffuser; simultaneously, rest light beams form the light source are directly transmitted toward the refracting portion and are refracted by the refracting portion into the diffuser; as a result, the refracted light beams are diffused by the diffusing particles in the diffuser.

8 Claims, 11 Drawing Sheets

CANDLE-LIKE LIGHTING DEVICE

BACKGROUND OF THE INVENTION

1. Field of the Invention

The present invention relates to a light device, and more particularly to a candle-like lighting device.

2. Description of Related Art

A conventional candle-like lighting device comprises a light body. The light body has a shade member and a light source. The light source is assembled in the shade member. Two cross-sectional areas of a top and a bottom of the shade member are both smaller than a cross-sectional area of a middle of the shade member, so that the whole light body is flame-shaped. Under this arrangement, when the light source is turned on, the whole light body is substantially performed as a real flame. Therefore, the conventional candle-like lighting device is capable of making an ambient environment atmospheric.

However, although the conventional candle-like lighting device is substantially performed as the real flame, a light density in the shade member cannot be gradually decreased from a bottom of the shade member to a top of the shade member, so that the light device cannot be actually performed as the real flame; although the conventional candle-like lighting device is substantially performed as the real flame, the conventional candle-like lighting device has no interacting functions (for example, an illumination and a twinkle frequency of the light source cannot be varied with an ambient voice or an ambient airflow).

The present invention has arisen to mitigate and/or obviate the disadvantages of the conventional.

SUMMARY OF THE INVENTION

The main objective of the present invention is to provide an improved light device.

To achieve the objective, a candle-like lighting device comprises a light body having a diffuser, a light guider and a light source, the diffuser having a plurality of diffusing particles mounted therein, the light guider having a reflecting portion defined at one end thereof and having a refracting portion defined at another end thereof, the diffuser sleeving the light guider, and the light source assembled to the light guider. Wherein, the light source has a light unit; the light unit has a plurality of light chips mounted thereon; the light unit is assembled to a bottom of the reflecting portion of the light guider; the light chips correspond to the light guider; a cross-sectional area of the reflecting portion of the light guider is gradually reduced toward the bottom of the reflecting portion; the light source has a light unit and a reflecting unit; the light guider is assembled at one end of the reflecting unit; the light unit is assembled at another end of the reflecting unit; a cross-sectional area of the reflecting unit is gradually enlarged from another end of the reflecting unit toward one end of the reflecting unit; the light unit has a plurality of light chips mounted thereon; the reflecting unit encloses the light chips of the light unit; wherein, the partial light beams form the light source are reflected by the reflecting unit toward the refracting portion and are refracted by the refracting portion into the diffuser; the rest light beams form the light source are directly transmitted toward the refracting portion and are refracted by the refracting portion into the diffuser; the candle-like lighting device further comprises a light stand; the light stand has a connecting portion defined at one end thereof; the light body is movably assembled to the connecting portion of the light stand; the connecting portion of the light stand has a sensor assembled thereon; the sensor is electrically connected to the light source; when the sensor senses an ambient voice or an ambient airflow, an illumination and a twinkle frequency of the light source is varied; the candle-like lighting device further comprises a controller electrically connected to the light unit; the controller has a processer so as to control the illumination and the twinkle frequency of each light chip; the light body further comprises a core; the core is mounted in the reflecting portion of the light guider; the light body is formed in one piece.

Under this arrangement, partial light beams from the light source are reflected by the reflecting portion toward the refracting portion and are refracted by the refracting portion into the diffuser; simultaneously, rest light beams form the light source are directly transmitted toward the refracting portion and are refracted by the refracting portion into the diffuser; as a result, the refracted light beams are diffused by the diffusing particles in the diffuser.

Further benefits and advantages of the present invention will become apparent after a careful reading of the detailed description with appropriate reference to the accompanying drawings.

DETAILED DESCRIPTION OF THE INVENTION

Figure 1:
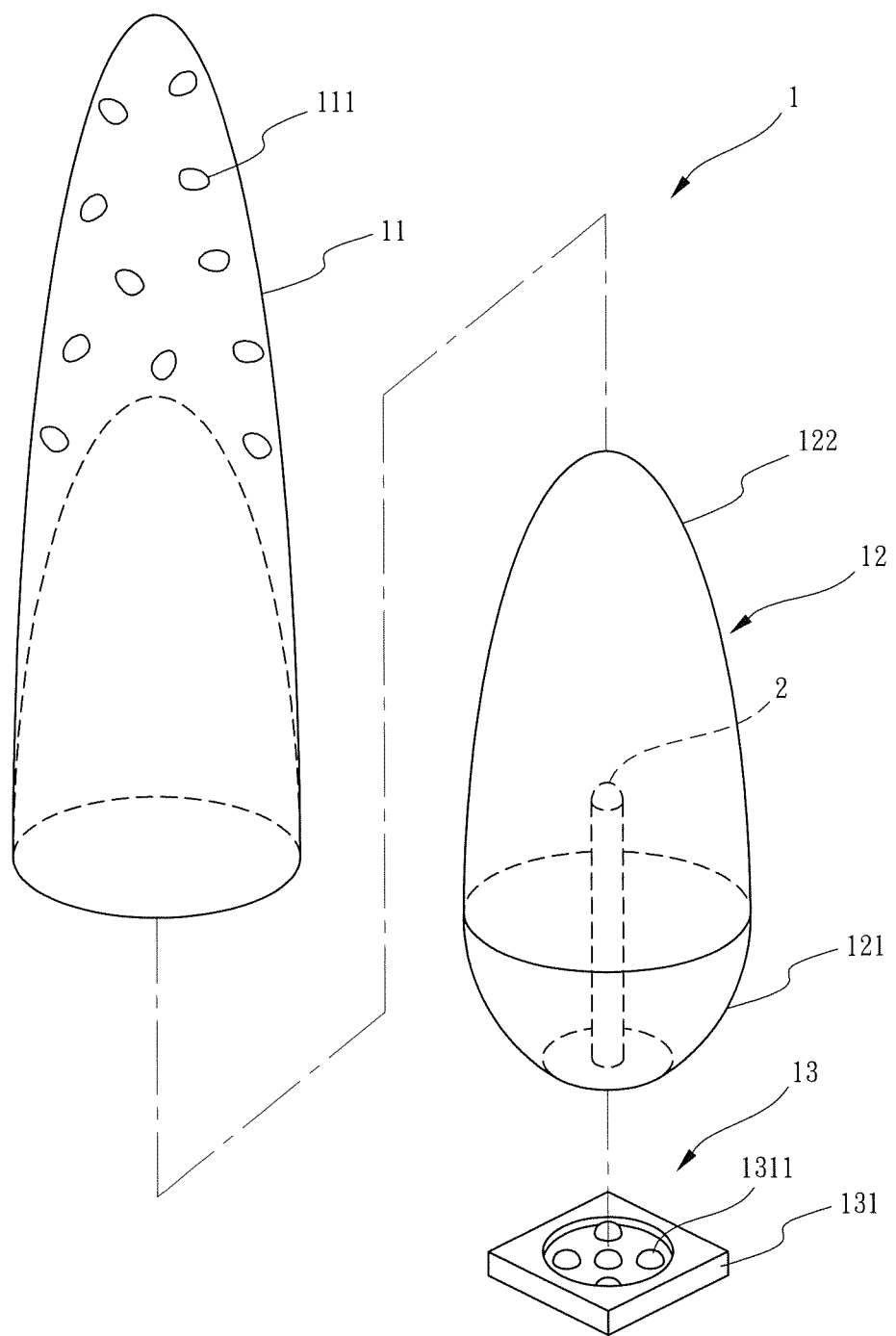
FIG. 1 is an exploded view of a first embodiment of the present invention.
Figure 2:
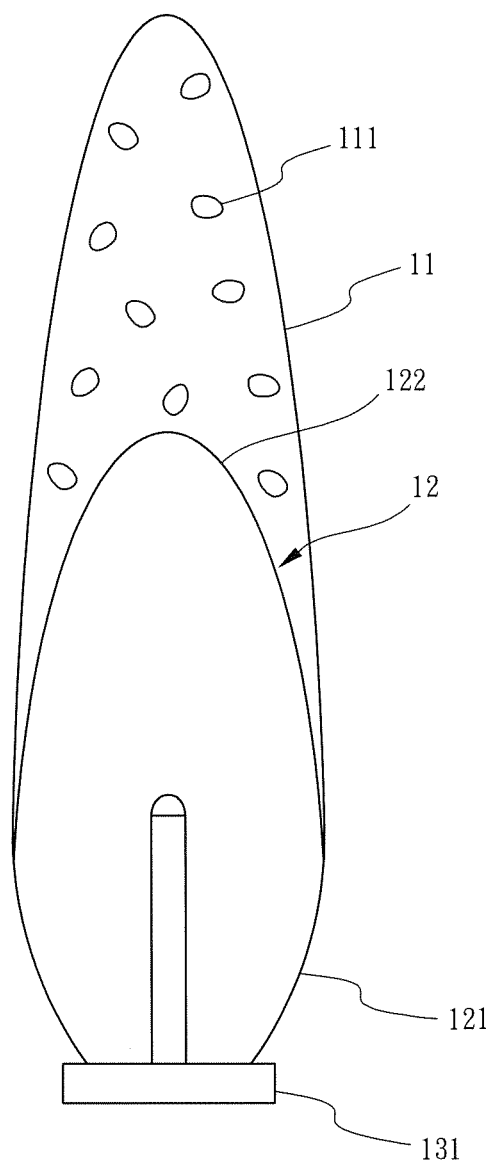
FIG. 2 is a side view of the first embodiment.
Figure 3:
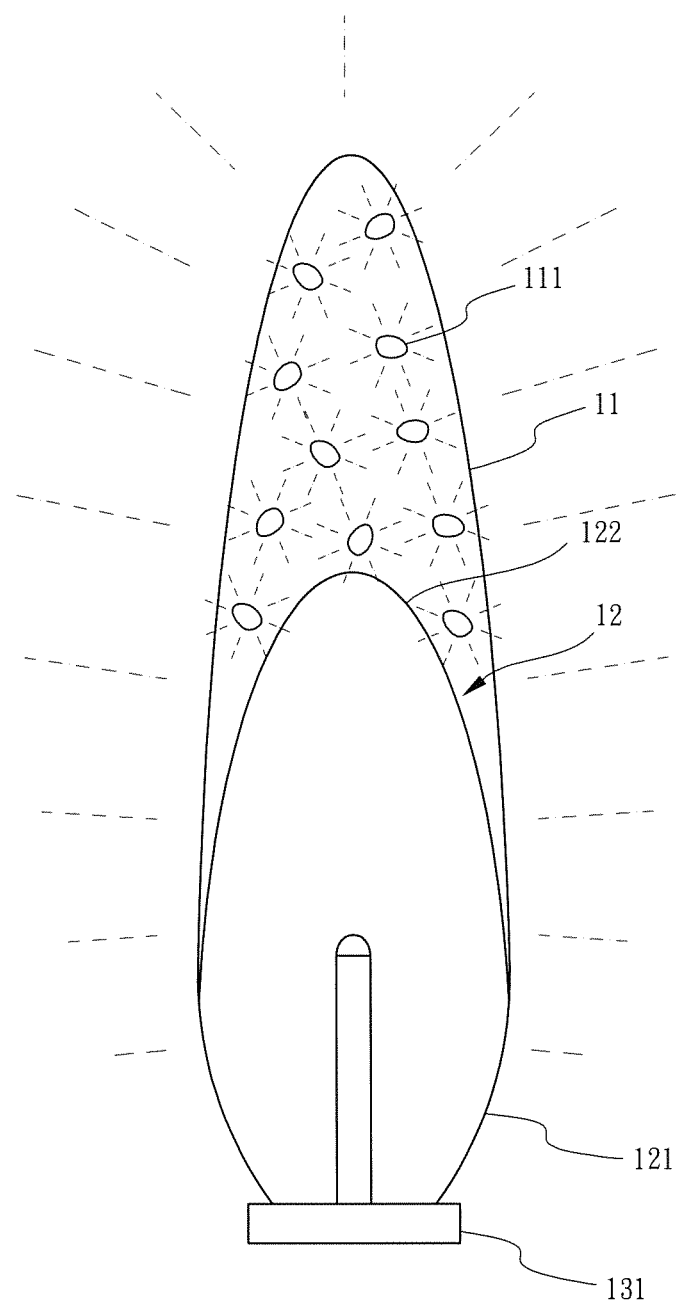
FIG. 3 is a side view of the first embodiment for showing a plurality of diffusing particles which diffuses light beams.
Figure 4:
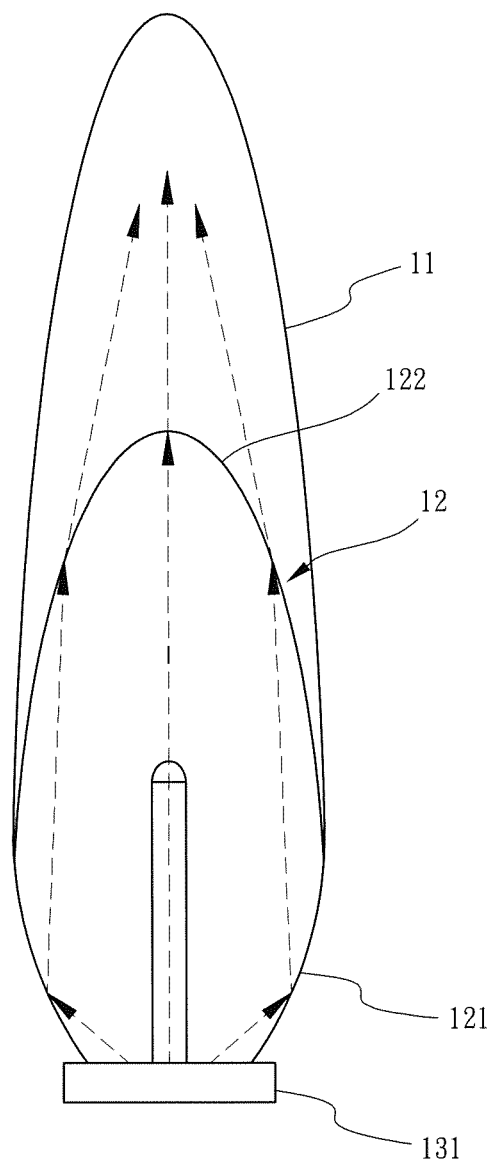
FIG. 4 is a side view of the first embodiment for showing the light beams which are being transmitted.
Figure 5:
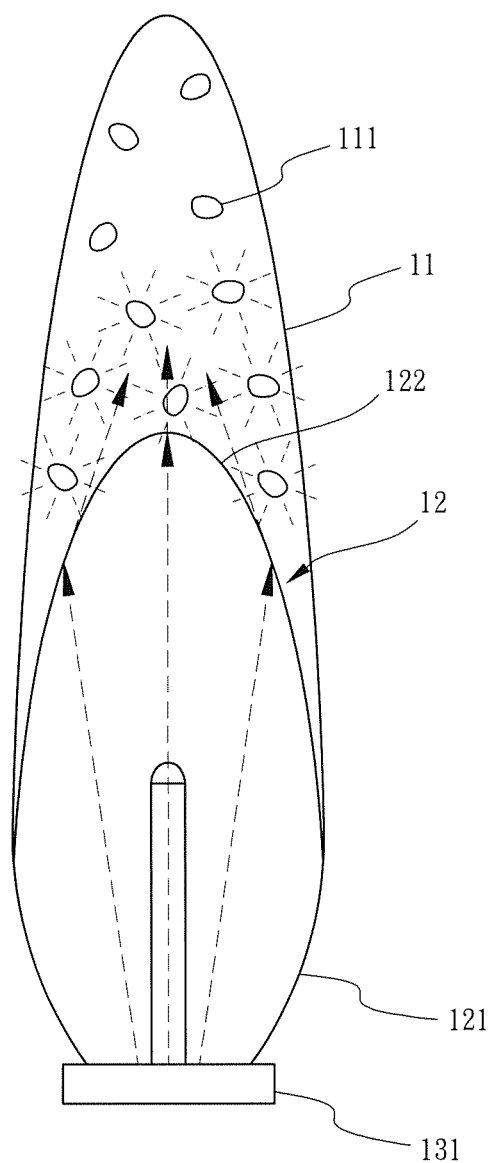
FIG. 5 is a side view of the first embodiment for showing a curvature of a surface of a refracting portion defined as a low curvature.

Referring to FIGS. 1-6 corresponding to a first embodiment, a candle-like lighting device in accordance with the present invention comprises a light body 1. Two cross-sectional areas of a top and a bottom of the light body 1 are both smaller than a cross-sectional area of a middle of the light body 1, so that the light body 1 is flame-shaped. The light body 1 is formed in one piece or several parts. The light body 1 has a diffuser 11, a light guider 12 and a light source 13. The diffuser 11 is made of transparent silica gel. The light guider 12 is made of acrylic material. The diffuser 11 has a plurality of diffusing particles 111 mounted therein. The light guider 12 has a reflecting portion 121 defined at one end thereof. The light guider 12 has a refracting portion 122 defined at another end thereof. The diffuser 11 sleeves the light guider 12. The light source 13 is assembled to the light guider 12. Under this arrangement, when the light source 13 is turned on (as shown in FIGS. 4-5), a plurality of light beams is emitted from the light source 13; then, the partial light beams are reflected by the reflecting portion 121 toward the refracting portion 122 and are refracted by the refracting portion 122 into the diffuser 11; simultaneously, the rest light beams are directly transmitted toward the refracting portion 122 and are refracted by the refracting portion 122 into the diffuser 11; thereafter, the refracted light beams are diffused by the diffusing particles 111 in the diffuser 11; as a result, a light density in the diffuser 11 is gradually decreased from a bottom of the diffuser 11 to a top of the diffuser 11. Therefore, the light body 1 is preformed as a real flame.

Referring to FIGS. 1-4, the light source 13 has a light unit 131. The light unit 131 has a plurality of light chips 1311 mounted thereon. The light unit 131 is assembled to a bottom of the reflecting portion 121 of the light guider 12. The light chips 1311 correspond to the light guider 12. A cross-sectional area of the reflecting portion 121 of the light guider 12 is gradually reduced toward the bottom of the reflecting portion 121, so that an inner wall of the reflecting portion 121 is inclined so as to reflect the partial light beams from the light chips 1311 of the light source 13. The light body 1 further comprises a core 2. The core 2 is mounted in the reflecting portion 121 of the light guider 12, so that the light body 1 is preformed as the real flame because of the core 2.

Referring to FIG. 3, when the refracted light beams from the light guider 12 are transmitted to the diffusing particles 111, the diffusing particles 111 diffuse the refracted light beams. In addition, a density of the diffusing particles 111 is adjustable in the diffuser 11, so that the light density in the diffuser 11 is adjustable. Therefore, a color temperature of the light body 1 is adjustable via adjusting the density of the diffusing particles 111.

Figure 6:
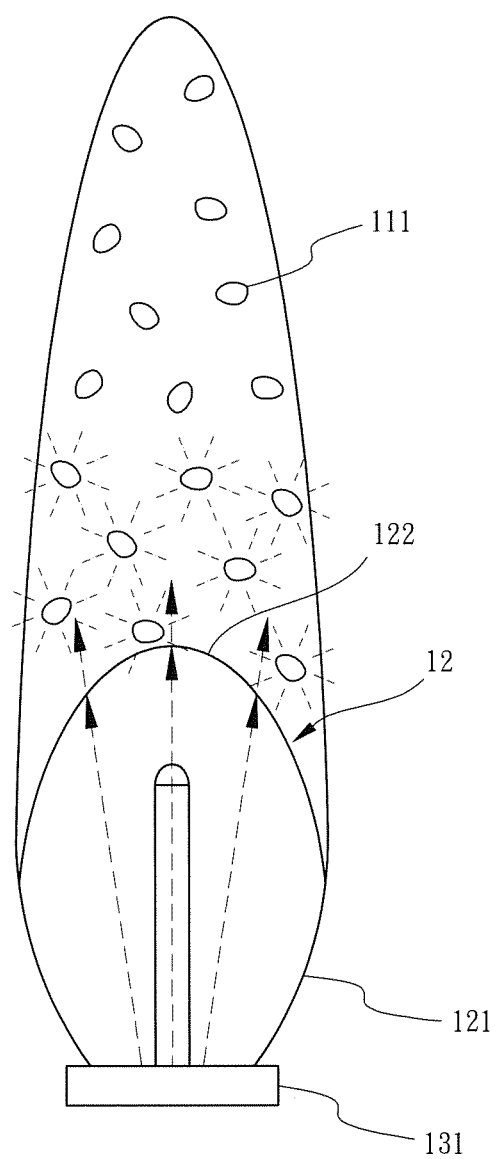
FIG. 6 is a side view of the first embodiment for showing a curvature of a surface of a refracting portion defined as a high curvature.

Referring to FIGS. 5-6, a curvature of a surface of the refracting portion 122 is definable. When the curvature of a surface of the refracting portion 122 is defined as a low curvature, one distance is defined between a top of the refracting portion 122 and the light source 13, and one further distance is defined between the bottom of the diffuser 11 and the top of the diffuser 11 (as shown in FIG. 5). When the curvature of the surface of the refracting portion 122 is defined as a high curvature, another distance is defined between the top of the refracting portion 122 and the light source 13, and another further distance is defined between the bottom of the diffuser 11 and the top of the diffuser 11 (as shown in FIG. 6). Said one distance is longer than said another distance. Said one further distance is shorter than said another further distance. The light density in the diffuser 11 is gradually decreased from the bottom of the diffuser 11 to the top of the diffuser 11. Therefore, an axial portion with highest light density in the diffuser 11 is definable via said definable curvature of the surface of the refracting portion 122.

Figure 7:
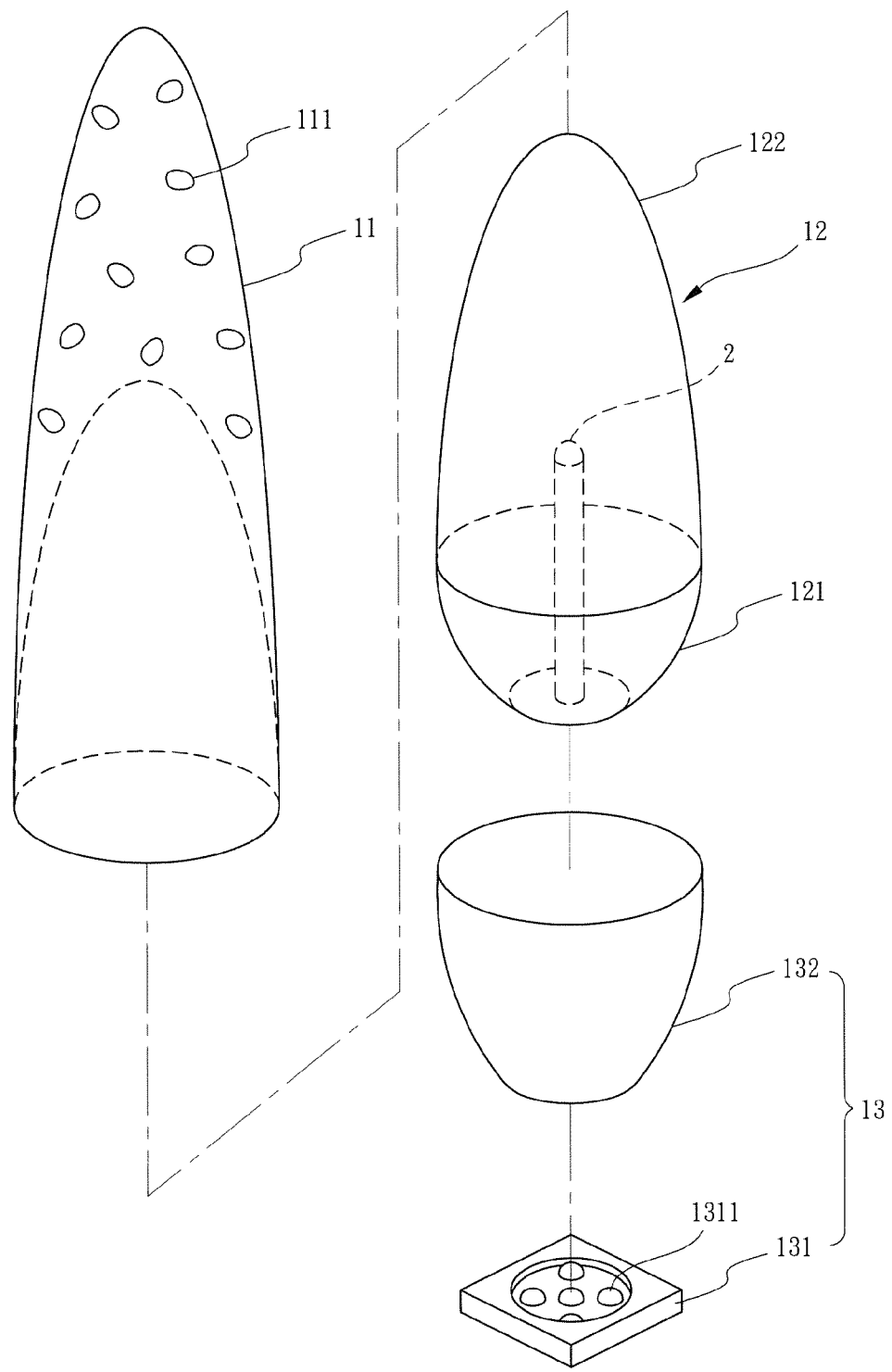
FIG. 7 is an exploded view of a second embodiment of the present invention.
Figure 8:
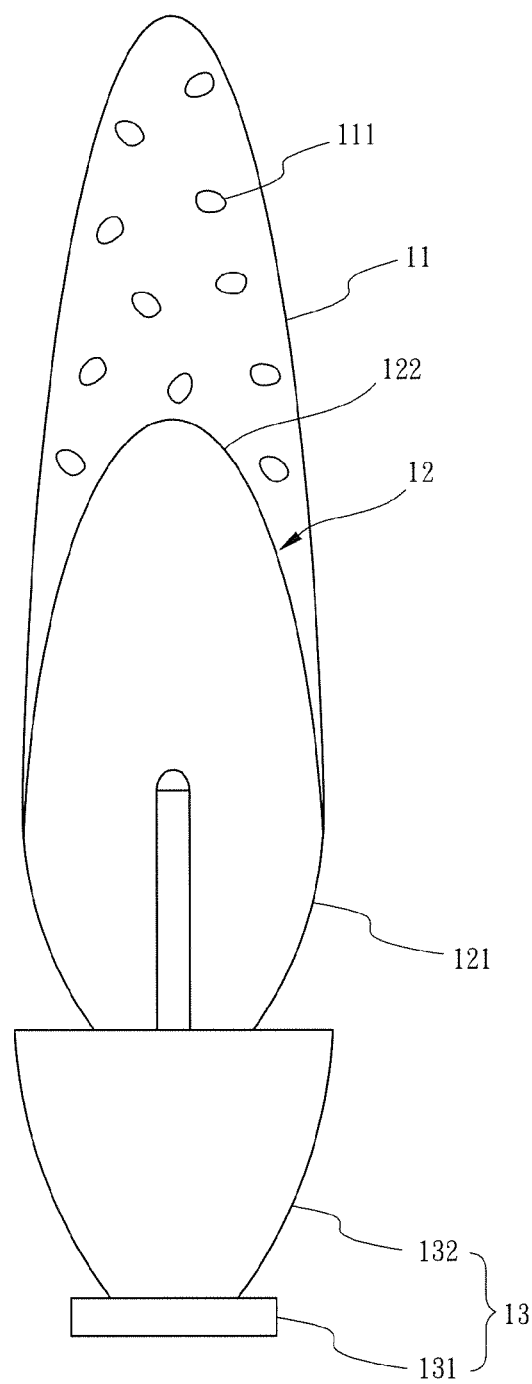
FIG. 8 is a side view of the second embodiment.
Figure 9:
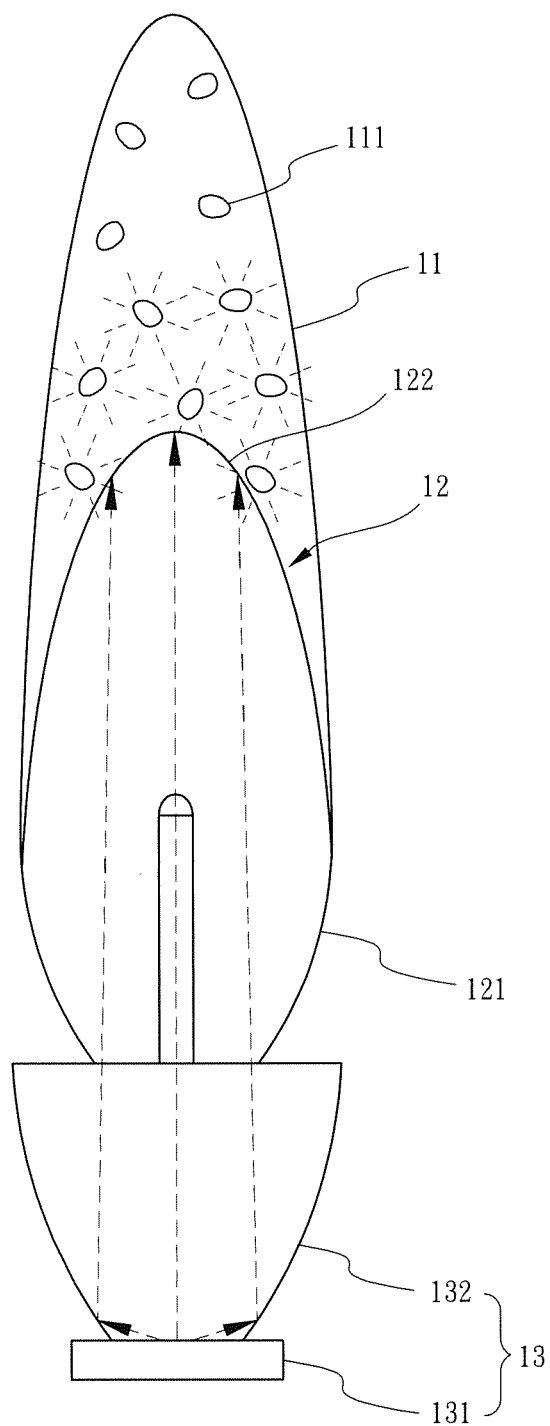
FIG. 9 is a side view of the second embodiment for showing a plurality of diffusing particles which diffuses light beams.

Referring to FIGS. 7-8 corresponding to a second embodiment (only the difference between the first embodiment and the second embodiment is further described), the light source 13 has a light unit 131 and a reflecting unit 132. The light guider 12 is assembled at one end of the reflecting unit 132. The light unit 131 is assembled at another end of the reflecting unit 132. A cross-sectional area of the reflecting unit 132 is gradually enlarged from another end of the reflecting unit 132 toward one end of the reflecting unit 132. The light unit 131 has a plurality of light chips 1311 mounted thereon. The reflecting unit 132 encloses the light chips 1311 of the light unit 131. Under this arrangement, when the light source 13 is turned on (as shown in FIG. 9), the light beams is emitted from the light source 13; then, the partial light beams are reflected by the reflecting unit 132 toward the refracting portion 122 and are refracted by the refracting portion 122 into the diffuser 11; simultaneously, the rest light beams are directly transmitted toward the refracting portion 122 and are refracted by the refracting portion 122 into the diffuser 11. Therefore, before the light beams are transmitted into the light guider 12, the light beams are reflected by the reflecting unit 132.

Figure 10:
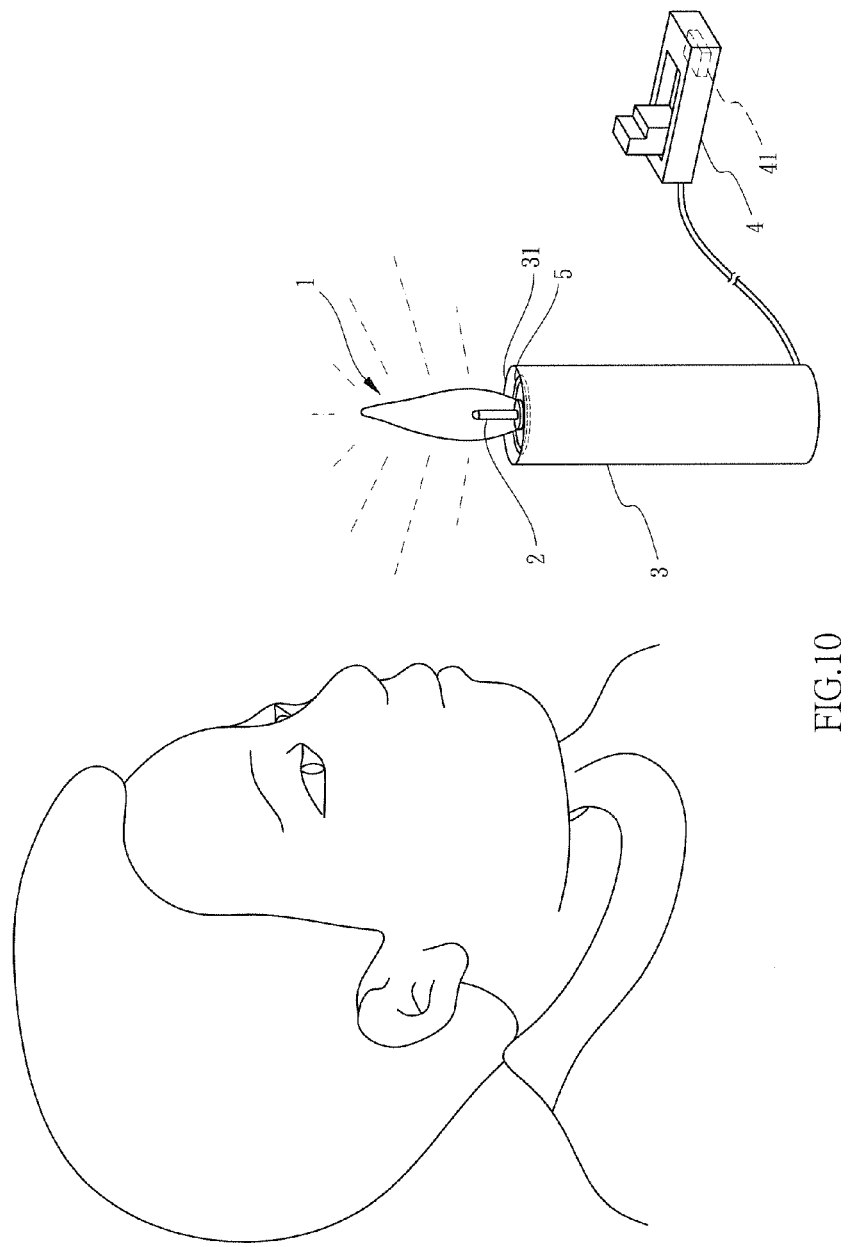
FIGS. 10-11 are the perspective views for showing an interaction between a user and the present invention.
Figure 11:
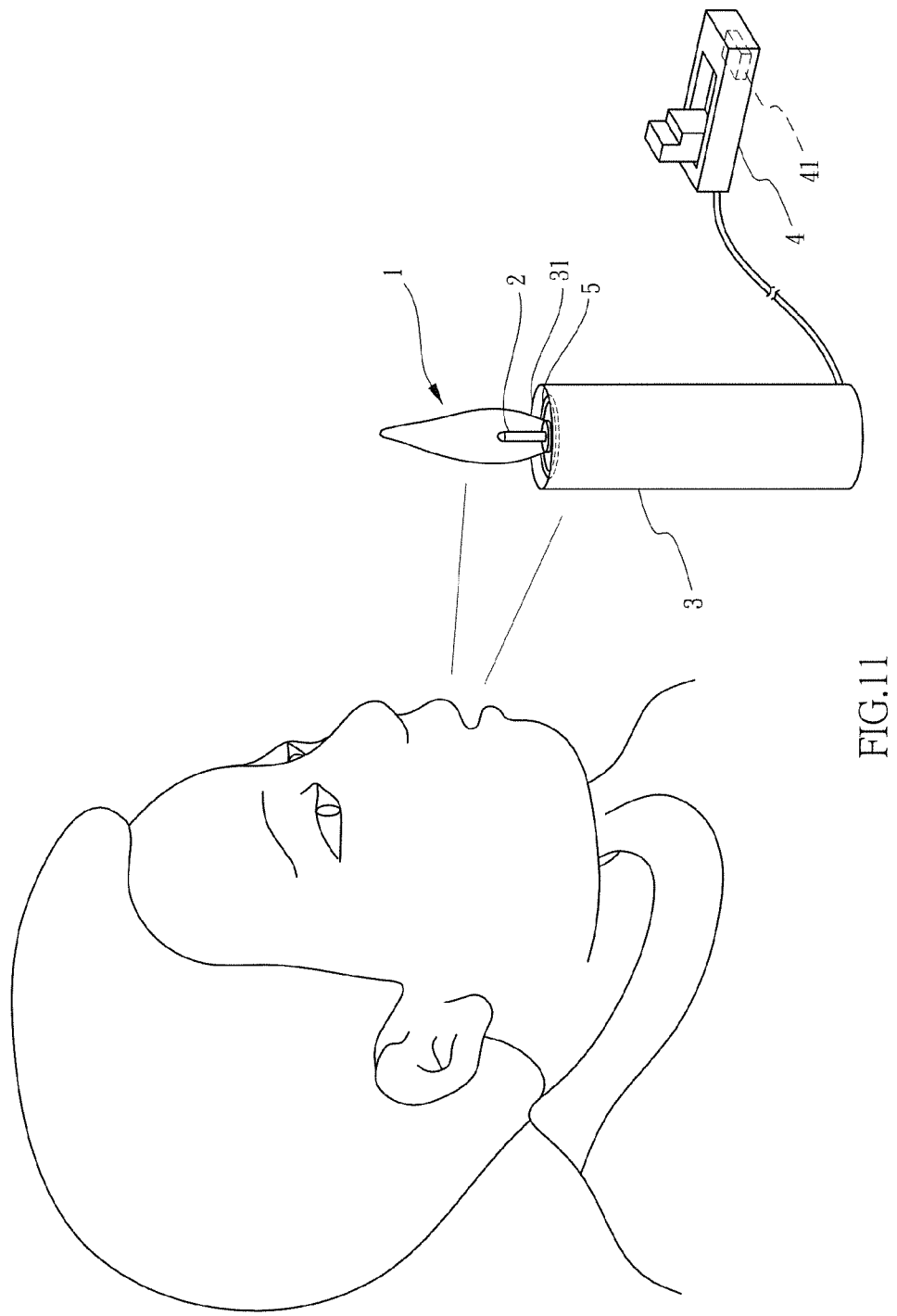

Furthermore, referring to FIGS. 10-11, the candle-like lighting device in accordance with the present invention further comprises a light stand 3 and a controller 4. The controller 4 is electrically connected to the light unit 131. The light stand 3 has a connecting portion 31 defined at one end thereof. The light body 1 is movably assembled to the connecting portion 31 of the light stand 3 (said movably assembling method might be pivoting method or floating method), so that when the light body 1 is blown by ambient airflow, the light body 1 swings as the real flame. In addition, the controller 4 has a processor 41 so as to control an illumination and a twinkle frequency of each light chip 1311 of the light source 13 of the light body 1; the connecting portion 31 of the light stand 3 has a sensor 5 assembled thereon; the sensor 5 is electrically connected to the light source 13; when the sensor 5 senses an ambient voice or said ambient airflow, the controller 4 varies the illumination and the twinkle frequency of each light chip 1311 of the light source 13 of the light body 1; referring to FIGS. 10-11, when the light body 1 is turned on and a user blows the sensor 5 near the light body 1, the light body 1 would be turned off as a real flame of a candle.

Although the invention has been explained in relation to its preferred embodiment, it is to be understood that many other possible modifications and variations can be made without departing from the spirit and scope of the invention as hereinafter claimed.

What is claimed is:

1. A candle-like lighting device comprising:
   a light body having a diffuser, a light guider and a light source;
   the diffuser having a plurality of diffusing particles mounted therein;
   the light guider having a reflecting portion defined at one end thereof and having a refracting portion defined at another end thereof, the diffuser sleeving the light guider; and
   the light source assembled to the light guider;
   wherein, when the light source is turned on, partial light beams from the light source are reflected by the reflecting portion toward the refracting portion and are refracted by the refracting portion into the diffuser; simultaneously, rest light beams form the light source are directly transmitted toward the refracting portion and are refracted by the refracting portion into the diffuser; as a result, the refracted light beams are diffused by the diffusing particles of the diffuser;
   wherein the light source has a light unit; the light unit has a plurality of light chips mounted thereon; the light unit is assembled to a bottom of the reflecting portion of the light guider; the light chips correspond to the light guider; a cross-sectional area of the reflecting portion of the light guider is gradually reduced toward the bottom of the reflecting portion.

2. The candle-like lighting device as claimed in claim 1, wherein the candle-like lighting device further comprises a light stand; the light stand has a connecting portion defined at one end thereof; the light body is movably assembled to the connecting portion of the light stand.

3. The candle-like lighting device as claimed in claim 2, wherein the connecting portion of the light stand has a sensor assembled thereon; the sensor is electrically connected to the light source; when the sensor senses an ambient voice or an ambient airflow, an illumination and a twinkle frequency of the light source is varied.

4. The candle-like lighting device as claimed in claim 1, wherein the candle-like lighting device further comprises a controller electrically connected to the light unit; the controller has a processer so as to control the illumination and the twinkle frequency of each light chip.

5. A candle-like lighting device comprising:
- a light body having a diffuser, a light guider and a light source;
- the diffuser having a plurality of diffusing particles mounted therein;
- the light guider having a reflecting portion defined at one end thereof and having a refracting portion defined at another end thereof, the diffuser sleeving the light guider; and
- the light source assembled to the light guider;
- wherein, when the light source is turned on, partial light beams from the light source are reflected by the reflecting portion toward the refracting portion and are refracted by the refracting portion into the diffuser; simultaneously, rest light beams form the light source are directly transmitted toward the refracting portion and are refracted by the refracting portion into the diffuser; as a result, the refracted light beams are diffused by the diffusing particles of the diffuser;
- wherein the light source has a light unit and a reflecting unit; the light guider is assembled at one end of the reflecting unit; the light unit is assembled at another end of the reflecting unit; a cross-sectional area of the reflecting unit is gradually enlarged from another end of the reflecting unit toward one end of the reflecting unit.

6. The candle-like lighting device as claimed in claim 5, wherein the light unit has a plurality of light chips mounted thereon; the reflecting unit encloses the light chips of the light unit; wherein, the partial light beams form the light chips are reflected by the reflecting unit toward the refracting portion and are refracted by the refracting portion into the diffuser; the rest light beams form the light chips are directly transmitted toward the refracting portion and are refracted by the refracting portion into the diffuser.

7. A candle-like lighting device comprising:
- a light body having a diffuser, a light guider and a light source;
- the diffuser having a plurality of diffusing particles mounted therein;
- the light guider having a reflecting portion defined at one end thereof and having a refracting portion defined at another end thereof, the diffuser sleeving the light guider; and
- the light source assembled to the light guider;
- wherein, when the light source is turned on, partial light beams from the light source are reflected by the reflecting portion toward the refracting portion and are refracted by the refracting portion into the diffuser; simultaneously, rest light beams form the light source are directly transmitted toward the refracting portion and are refracted by the refracting portion into the diffuser; as a result, the refracted light beams are diffused by the diffusing particles of the diffuser;
- wherein the light body further comprises a core; the core is mounted in the reflecting portion of the light guider.

8. The candle-like lighting device as claimed in claim 7, wherein the light body is formed in one piece.

* * * * *